Dec. 2, 1924.                                              1,517,756
R. SANTORO
TROLLEY HARP AND TROLLEY HEAD
Filed Sept. 10, 1924
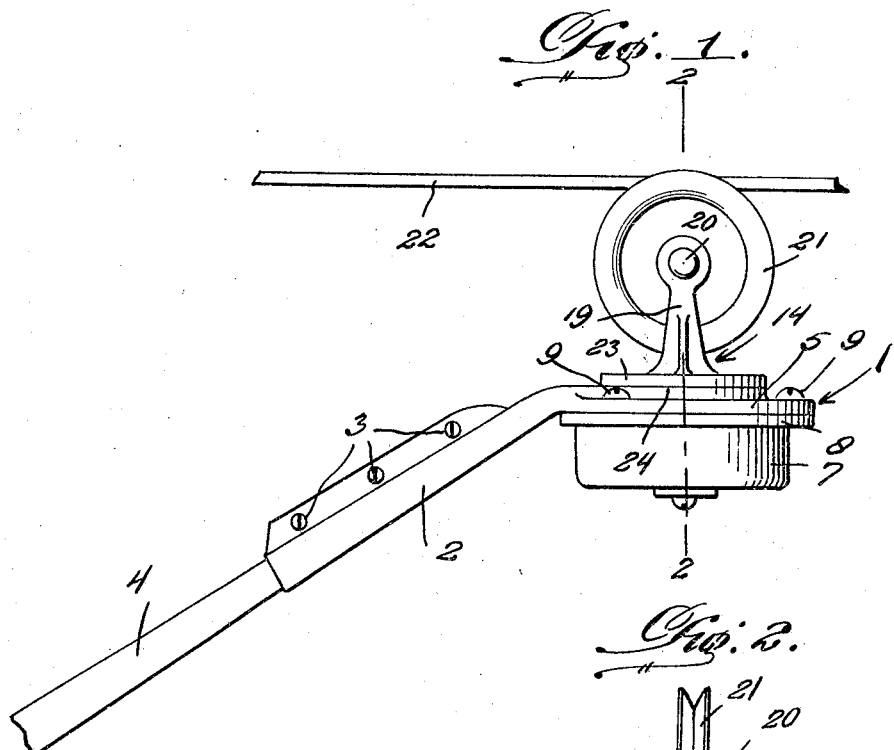
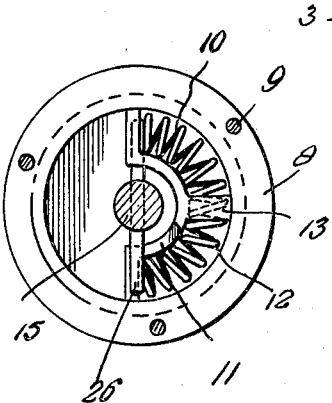
Ralph Santoro,
Inventor
By Clarence A. O'Brien
Attorney

Patented Dec. 2, 1924.

1,517,756

UNITED STATES PATENT OFFICE.

RALPH SANTORO, OF PHILADELPHIA, PENNSYLVANIA.

TROLLEY HARP AND TROLLEY HEAD.

Application filed September 10, 1924. Serial No. 736,925.

*To all whom it may concern:*

Be it known that I, RALPH SANTORO, a citizen of the United States, residing at Philadelphia, in the county of Philadelphia and State of Pennsylvania, have invented certain new and useful Improvements in a Trolley Harp and Trolley Head, of which the following is a specification.

This invention relates to improvements in trolley harps and trolley heads and has for its principal object to provide a simple and efficient means whereby the trolley wheel may accommodate itself to the irregularities of the trolley wire.

Another important object of the invention is to provide a trolley harp and trolley head of the above mentioned character, which will automatically position itself in alignment with the trolley wire so that the trolley wheels will not become disengaged from the trolley wire regardless of the curve in the trolley wire.

A still further object of the invention is to provide a trolley harp and trolley head of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the trolley harp and trolley head embodying my invention showing the same in position on a trolley pole and in engagement with the trolley wire.

Figure 2 is a vertical section taken approximately on line 2—2 of Figure 1, and

Figure 3 is a sectional view taken approximately on line 3—3 of Figure 2.

In the drawing wherein for the purpose of illustration is shown the preferred embodiment of my invention, the numeral 1 designates generally the trolley head and the same comprises a sleeve 2 which is split longitudinally and the free edges thereof are bent upwardly for cooperation with each other and to further receive the fastening members 3 for securing the sleeve on the upper end of the usual trolley pole 4. The upper end of the sleeve 2 terminates in the horizontally disposed substantially flat plate 5, the latter being provided with a central opening 6, the purpose of which will hereinafter be more fully described.

The trolley head 1 further includes the circular casing 7 which is open at its top and the annular flange 8 extends around the outer upper edge of the casing for cooperation with the under side of the circular plate 5 to which the same is secured by the fastening screws 9. The bottom of the circular casing 7 is also provided with a central opening for registry with the opening 6 provided in the circular plate 5.

Arranged within the circular casing 7 is a substantially semi-circular wall 10 which is spaced from the inner wall of the casing and the same is slotted as is illustrated at 11 for the purposes to be presently described. An expansible coil spring 12 is disposed between the semi-circular wall 10 and the inner wall of the casing 7 and for the purpose of preventing the displacement of the coil spring, a connection 13 extends between the upper portion of the wall and the casing respectively in the manner as clearly illustrated in Figure 2.

The trolley harp is designated generally by the numeral 14 and the same comprises the spindle 15 which extends through the aligning openings provided in the plate 5 and the bottom of the casing 7 and is further adapted for rotary movement therein. A retaining cap 16 is supported on the lower end of the spindle on the outside of the bottom of the casing 7 by means of the fastening screw or bolt 17. A pair of spaced arms 18 and 19 respectively extend upwardly from the spindle 15 of the trolley harp and provide a means for supporting in the upper ends thereof the rotary shaft 20 on which is mounted the trolley wheel 21. The trolley wheel is adapted for rotation between the arms 18 and 19 and engages the trolley wire 22. A flange 23 is formed on the trolley harp 14 at the junction of the spindle and the arms and this flange cooperates with the upper surface of the thickened portion 24 formed on the circular plate 5 in retaining the ball bearings 25 in the manner as clearly illustrated in Figure 2. The provision of the ball bearings 25 will reduce the friction between the trolley harp and the trolley head to a minimum and to permit the swinging movement of the trolley harp on the trolley head in a horizontal plane.

The lower portion of the spindle 15 receives and mounts the transversely extending pin 26 the ends of which engage the respective ends of the expansible coil spring 12. The ends of the transverse pin are also adapted to project through the slot 11 formed in the semi-circular wall 10. The purpose of the provision of the transverse pin 26 and the expensible coil spring 12 is to at all times insure the engagement of the trolley wheel with the trolley wire regardless of the irregularity of the trolley wire. In this manner the trolley wheel may accommodate itself to the various curves of the trolley wire and the coil spring 12 together with the transverse pin 26 will prevent any possibility of the trolley wheel becoming disengaged from the trolley wire.

The simplicity in which my improved trolley harp and trolley head is constructed enables the same to be easily and readily assembled and will at all times be positive and efficient in its operation when in position on the upper end of a trolley pole.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In a trolley harp and trolley head therefor, the combination with a trolley pole, a trolley head comprising a substantially flat base plate, means for securing the same on the upper end of the trolley pole, a casing secured to the bottom of the base plate, a trolley harp rotatably supported on said head comprising a spindle extending centrally through the base plate and the casing, a pair of spaced arms extending upwardly from the upper portion of the stem, a wheel rotatably mounted between the upper ends of said arms, means in said casing cooperating with the lower portion of the spindle for maintaining the wheels in engagement with the trolley wire, said means comprising a substantially semi-circular wall arranged in the casing, and spaced from the inner wall of the casing, an expansible coil spring supported between the semi-circular wall and the inner wall of the casing, said semi-circular wall having a slot formed therein, and a transverse pin extending through the lower portion of the spindle and adapted for engagement with the respective ends of the coil spring.

In testimony whereof I affix my signature.

RALPH SANTORO.